US010498460B2

(12) United States Patent
Dalvand et al.

(10) Patent No.: US 10,498,460 B2
(45) Date of Patent: Dec. 3, 2019

(54) AMPLIFIED MULTISTAGE DEMULTIPLEXER

(71) Applicant: Juniper Networks, Inc., Sunnyvale, CA (US)

(72) Inventors: Naser Dalvand, Mountain View, CA (US); Erik Johan Norberg, Santa Barbara, CA (US); Brian Robert Koch, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/910,767

(22) Filed: Mar. 2, 2018

(65) Prior Publication Data

US 2019/0273563 A1 Sep. 5, 2019

(51) Int. Cl.
*H04B 10/60* (2013.01)
*H04J 14/02* (2006.01)

(52) U.S. Cl.
CPC .............. *H04B 10/60* (2013.01); *H04J 14/02* (2013.01)

(58) Field of Classification Search
CPC ................................. H04B 10/60; H04J 14/02
See application file for complete search history.

(56) References Cited

U.S. PATENT DOCUMENTS

| | | | | |
|---|---|---|---|---|
| 5,422,968 A * | 6/1995 | Hanatani | ............ | G02B 6/12007 385/22 |
| 6,115,156 A * | 9/2000 | Otani | ................. | H04B 10/2519 398/1 |
| 6,259,555 B1 * | 7/2001 | Meli | ................... | H04J 14/0221 359/337 |
| 6,819,478 B1 * | 11/2004 | Islam | ................. | H04B 10/2916 359/334 |
| 7,519,246 B2 * | 4/2009 | Welch | ................ | G02B 6/12004 372/26 |
| 9,780,528 B1 * | 10/2017 | Zheng | ................... | H01S 5/1032 |
| 2001/0024543 A1 | 9/2001 | Ahmadvand et al. | | |
| 2002/0006250 A1 | 1/2002 | Wedding | | |
| 2002/0141047 A1 | 10/2002 | Vusirikala et al. | | |
| 2003/0043431 A1 * | 3/2003 | Chand | ................... | B82Y 20/00 398/98 |
| 2004/0033004 A1 * | 2/2004 | Welch | ................... | B82Y 20/00 385/14 |

(Continued)

FOREIGN PATENT DOCUMENTS

| | | | | |
|---|---|---|---|---|
| CN | 110221388 | | 9/2019 | |
| EP | 1162773 | A2 * | 12/2001 | ............. H04J 14/02 |
| EP | 3534553 | | 9/2019 | |

OTHER PUBLICATIONS

"European Application Serial No. 18215219.9, Extended European Search Report dated Jul. 25, 2019", 9 pgs.

*Primary Examiner* — Leslie C Pascal
(74) *Attorney, Agent, or Firm* — Schwegman Lundberg & Woessner, P.A.

(57) ABSTRACT

Described are various configurations for an amplifying optical demultiplexer. Various embodiments can receive an input signal comprising multiple sub-signals, and separate and amplify the signals within the demultiplexer. Some embodiments include a multistage demultiplexer with amplifiers located between a first and second stage. Some embodiments include a multistage demultiplexer with amplifiers located between a second and third stage.

19 Claims, 11 Drawing Sheets

(56) References Cited

U.S. PATENT DOCUMENTS

2005/0058459 A1\* 3/2005 Chandrasekhar ...... G02B 6/266
398/161
2005/0213883 A1   9/2005 Welch et al.
2010/0150562 A1\* 6/2010 Lee ................. H04B 10/25133
398/81

\* cited by examiner

AMPLIFIED MULTISTAGE DEMULTIPLEXER

TECHNICAL FIELD

The present disclosure generally relates to demultiplexers, and more particularly to signal quality and demultiplexers.

BACKGROUND

Multiplexing involves combining multiple signals into a single signal for distribution over a shared medium. For example, multiple optical signals having different wavelengths can be combined into a single combined optical signal, which is transmittable over a single fiber optic channel. When a combined signal is received, the individual signals are separated from each other in a process called demultiplexing. These signals can undergo loss caused by the components used to process and route the signals. The signal-to-noise ratio (SNR) can further be degraded by noise added by the components or from external interference sources. To address signal degradation, more sensitive signal detectors can be implemented. However, the sensitive signal detectors' voltage requirements introduce noise and further degrade SNR.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, and instruction sequences that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned above, multiplexed signals can undergo loss, and detectors have difficulty finding a signal buried in noise. Detector sensitivity can be increased, but sensitive detectors have higher power requirements, which can lead to additional noise. To this end, in example embodiments a receiver can include a multistage demultiplexer that has integrated amplifiers and a plurality of filter stages. The location of the integrated amplifiers within the demultiplexer can vary according to design considerations. If the amplifiers are placed after an initial stage that initially processes the multiplexed signal, the amplifiers can benefit from stronger signal strength, as the amplifiers are higher up the loss chain. However, the multiplexed signal may have an optical bandwidth that exceeds available amplifier optical bandwidths. In some embodiments, the amplifiers are integrated in the demultiplexer nearer to the last stage so the amplifiers can improve gain of narrower optical bandwidth signals (e.g., each amplifier may amplify an individual signal). The demultiplexer can be configured for different numbers of channels, such as two, four, or eight channels. Further, the demultiplexer can have different numbers of stages, with integrated amplifiers being located nearer to the input or output of the demultiplexer based on design considerations (e.g., amplifier optical bandwidth, amplifier saturation power, signal strengths, number of channels, etc.).

Figure 1:
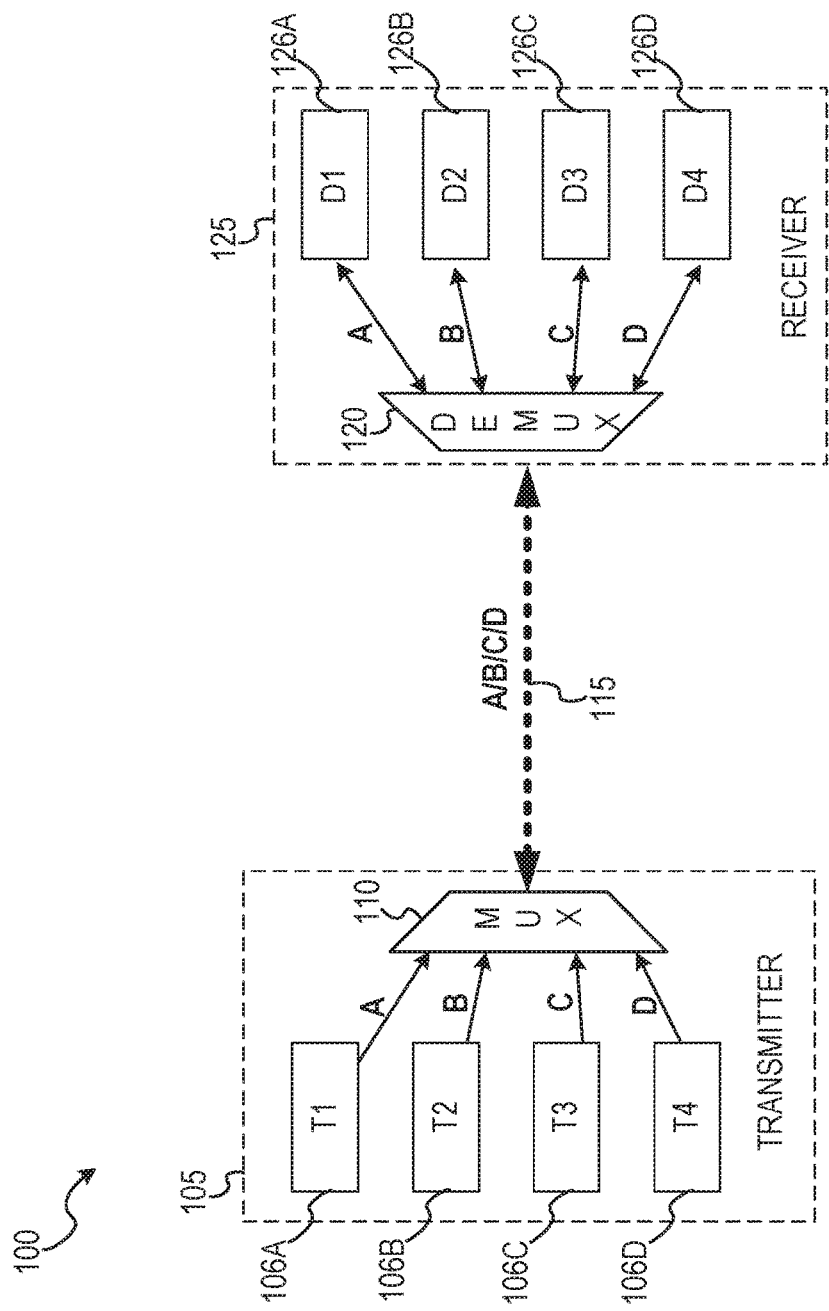
FIG. 1 shows an example architecture for implementing an amplifying optical demultiplexer, according to some example embodiments.

FIG. 1 shows an example wavelength-division multiplexing (WDM) architecture 100 for implementing an amplifying optical demultiplexer, according to some example embodiments. As illustrated, the transmitter 105 can receive or otherwise generate a plurality of signals. For example, the transmitter 105 can comprise a T1 transmitter 106A that generates an A-signal, a T2 transmitter 106B that generates B-signal, a T3 transmitter 106C that generates C-signal, and a T4 transmitter 106D that generates D-signal. In some example embodiments, the transmitter 105 does not generate the signals but instead receives signals from other sources for routing over a network, as is appreciated by one of ordinary skill in the art.

The plurality of signals can be combined into a single combined signal 115 using a multiplexer 110 ("MUX"). The combined signal 115 can be transmitted over a shared medium (e.g., a fiber-optic channel) to a receiver 125 at a remote destination. In the receiver 125, a demultiplexer ("DEMUX") 120 decodes (e.g., splits, separates) the combined signal 115 back into the plurality of individual signals. The plurality of individual signals can be detected by receiver detectors, e.g. D1 detector 126A, D2 detector 126B, D3 detector 126C, D4 detector 126D. For example, each of the receivers can be a PIN-based photodetector (e.g., photodiode) that can detect an individual optical signal from the demultiplexer 120. The receiver 125 may then transmit the received signals to further destinations for routing or processing.

Although FIG. 1 shows a WDM architecture 100 in which a transmitter 105 transmits all signals to a receiver 125, it is appreciated by one of ordinary skill in the art that the architecture 100 can be bidirectional over one or more of the channels. For example, transmitter 105 can be replaced by a bidirectional collection of transponders that have an ability to send and receive over the channels. Likewise, the receiver 125 can be replaced by an additional bidirectional collection of transponders that also have the ability to send and receive over the channels. Further, the example in FIG. 1 illustrates a four-channeled WDM architecture, it is appreciated by one of ordinary skill in the art that other numbers of channels (e.g., 2-channel, 8-channel) can likewise be implemented to achieve similar results.

One challenge in demultiplexing architectures is to achieve low enough losses to meet the sensitivity requirements of the receiver detectors, such as photodiodes. Avalanche photodiodes (APDs) can be implemented as receiver detectors to increase sensitivity; however, APDs have several disadvantages. In particular, APDs tend to be noisier than PIN-photodetectors. Further, APDs tend to have higher voltage requirements to bias the diodes, which can lead to harmful noise and saturation effects. It is also difficult to achieve high electrical bandwidth operation. Providing high bias voltage is not easily achieved with integrated receiver circuit architectures.

Optical amplifiers can be added to the receiver to increase signal gain. However, adding optical amplifiers to the receiver can introduce further noise (e.g., Amplified Spontaneous Emission (ASE)*Signal (Sig), ASE*ASE, ASE shot-noise) and can also introduce harmful saturation effects. For example, if an optical amplifier is placed before the demultiplexer (e.g., demultiplexer 120), the amplifier must provide gain for the entire optical bandwidth of the incoming WDM signal (e.g., combined signal 115), which can have an optical bandwidth size that exceeds what many amplifiers support. As such, providing gain for the entire optical bandwidth of a WDM signal is difficult and/or not practical. Furthermore, amplifying a multitude of input signals can saturate the gain material due to the increased power at the amplifier input and cause distortion and crosstalk between signals at the output.

Placing amplifiers after a demultiplexer (e.g., demultiplexer 120) creates a different set of challenges. One challenge arises from the fact that some demultiplexers cause signal loss, which directly lowers the SNR. If the degraded SNR is input into an amplifier, the noise is increased along with the signal, which can lead to poor results in the detector (e.g., the photodiode). An additional challenge arises from broadband optical noise (e.g., broadband ASE) from the amplifiers themselves. If the amplifiers are placed before the demultiplexer, the components of the demultiplexer, such as filters in the first stage, can filter out the broadband noise. However, if the amplifiers are located after the demultiplexer, the broadband noise (e.g., ASE*ASE optical beat noise, ASE shotnoise) is input into the detector, further degrading SNR.

To this end, the demultiplexer 120 can be configured as an amplifying optical demultiplexer that has a plurality of filter stages, with amplifiers being directly integrated between the stages. Generally, a combined signal can be split into constituent signals, which can in turn be amplified by optical amplifiers. In some example embodiments, the amplifying optical demultiplexer is integrated into a chip-integrated WDM receiver. The receiver chip can be formed from a base carrier wafer material comprising silicon, silica, and/or InP or other semiconductor materials. On the chip, the amplifying optical demultiplexer can include passive waveguides as channels that are formed out of the base wafer. In some embodiments, the amplifiers are semiconductor optical amplifiers (SOAs) that consist of a waveguide of the active semiconductor material. The SOAs can be integrated within the base carrier wafer by means of regrowth, heterogeneous, or hybrid integration, according to some example embodiments. The optical signal light can be coupled from the passive waveguide in the demultiplexer (e.g., stage 1 filters) to the active semiconductor waveguide of the SOA, and back to the passive waveguides in the demultiplexer (e.g., additional filters in other stages).

Figure 2:
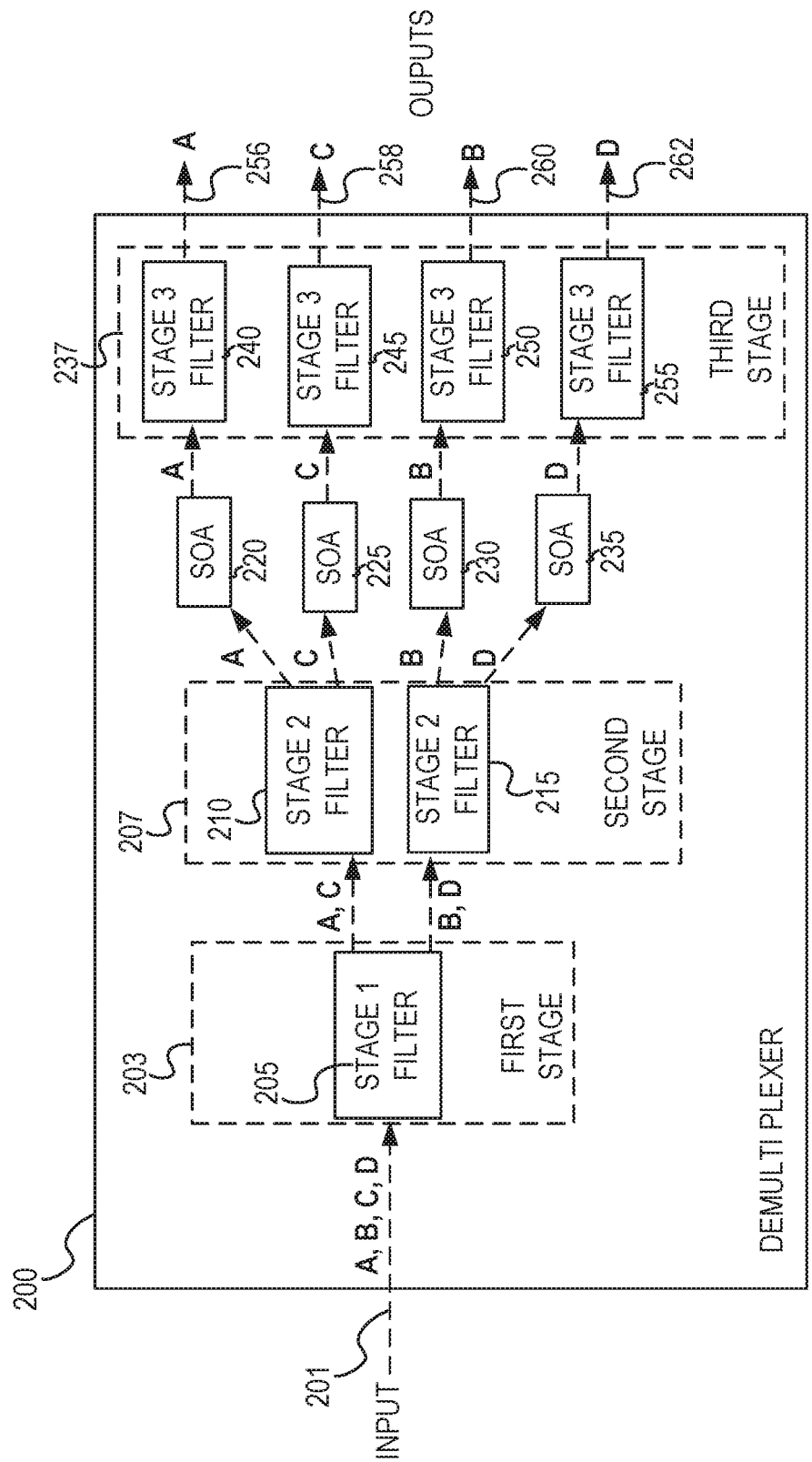
FIG. 2 illustrates an amplifying optical demultiplexer, according to some example embodiments.

FIG. 2 illustrates an amplifying optical demultiplexer 200, according to some example embodiments. The demultiplexer 200 is an example embodiment of demultiplexer 120 in which the demultiplexer 200 is designed to separate four CWDM (course wavelength-division multiplexing) channels spaced 20 nanometers (nm) apart. As illustrated, the demultiplexer 200 can receive a combined input signal 201. The combined input signal 201 may have a plurality of sub-signals, e.g., signal A, signal B, signal C, and signal D, as discussed above. The demultiplexer 200 comprises a plurality of stages, such as a first stage 203, a second stage 207, and a third stage 237. Each of the stages 203, 207, 237 can include one or more finite impulse response (FIR) filters (e.g., multistage or higher order FIR filters) and or infinite impulse response (IIR) filters, as discussed in further detail below.

As illustrated, the first stage 203 has a stage 1 filter 205 that separates the combined signal into a first composite signal (e.g., A, C composite signal) on a first waveguide, where the wave guides are denoted by dashed lines. The stage 1 filter 205 further separates the combined input signal 201 into a second composite signal (e.g., B, D composite signal) on another wave guide. The second stage 207 has a plurality of stage 2 filters including stage 2 filter 210 and stage 2 filter 215. The stage 2 filter 210 receives the first composite signal and separates it into two individual signals: signal A and signal C. Each of the individual signals generated from the second stage 207 can be amplified by a plurality of integrated SOAs that have been integrated into the demultiplexer 200 as internal components, such as SOAs 220-235. Each of the SOAs 220-235 increases the gain of an individual signal.

The third stage 237 can be used to further refine or otherwise suppress unwanted noise in the signals (e.g., crosstalk, broad spectrum white noise, noise added by the amplifiers). As illustrated, the third stage 237 includes stage 3 filters 240-255, each of which further filters and outputs individual signals 256-262. The further filtered individual signals 256-262 from the third stage 237 can then be output to receivers, e.g., photodiodes, for detection and further processing or routing.

One advantage of demultiplexer 200 is that the optical bandwidth and saturation requirements placed on the SOAs 220-235 are reasonable as each amplifier is managing an individual signal, not the entire four channel WDM signal. Further, the demultiplexer 200 can filter out ~3 dB of the broadband optical ASE spectrum, thereby reducing the ASE*ASE beat noise in the receiver. Furthermore, the optical-SNR of the demultiplexer 200 is improved since the loss of the third filter stage 237 does not contribute to the degradation of the optical-SNR.

In some example embodiments, demultiplexer 200 does not include a third stage 237. That is, for example, the demultiplexer 200 only includes the first stage 203, the second stage 207, and the SOAs 220-235, and the additional refining of signals in the third stage 237 is omitted. For instance, after the individual signals are amplified by the SOAs 220-235 the amplified individual signals are output from demultiplexer 200.

Figure 3A:
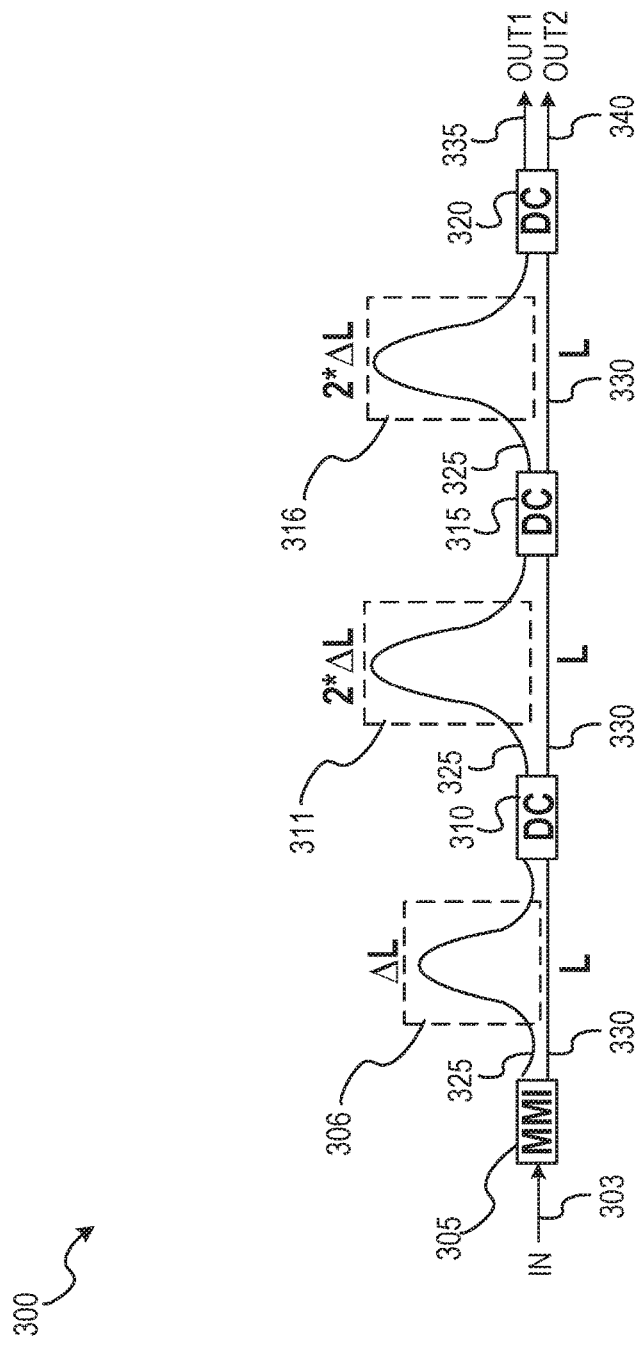
FIG. 3A shows an example filter that can be implemented in the stage 1 filter, according to some example embodiments.

FIG. 3A shows an example filter 300 that can be implemented in the stage 1 filter 205, according to some example embodiments. As illustrated, the filter 300 is a higher-order Mach-Zehnder Interferometer (MZI) filter comprising a 1 x2 multimode interferometer (MMI) coupler 305 that receives a single input signal 303 and outputs signals to a first channel 325 and second channel 330. The 1×2 MMI coupler 305 is followed by a sequence of directional couplers 310-320, which are connected by the two channels 325, 330 (e.g., waveguides) having different lengths. In particular, the first channel 325 has three delay stages 306, 311, and 316; with a first delay stage 306 having a length value $\Delta L$, and the two following delay stages 311 and 316 being twice as long, $2*\Delta L$. In some example embodiments, the output of directional coupler 320 is two composite signals 335 and 340, as discussed above. As used herein, the length value L is the length of the straight or non-delayed portion of a channel section, where the length $\Delta L$ is the increased length of a given delay stage. For example, the portion of the second channel 330 between the 1×2 MMI coupler 305 and the direct coupler 310 has a length of L, and the length of the first channel between the same couplers has a larger length of $\Delta L$.

Figure 3B:
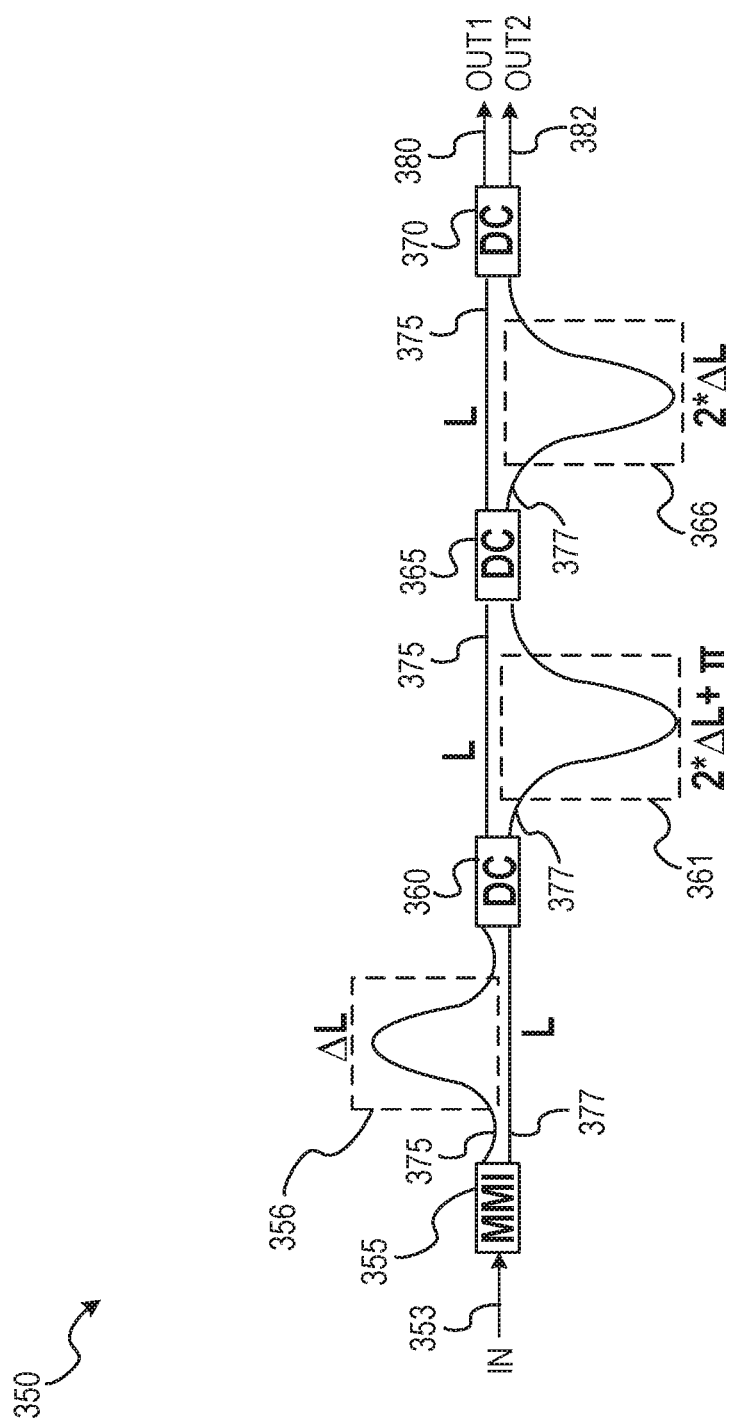
FIG. 3B shows an example filter that can be implemented in the stage 1 filter, according to some example embodiments.

FIG. 3B shows an example filter 350 that can be implemented in the stage 1 filter 205 instead of filter 300, according to some example embodiments. The filter 350 is a higher-order MZI filter comprising a 1×2 multimode interferometer (MMI) coupler 355 that receives a single input signal 353 and outputs to a first channel 375 and a second channel 377. The 1×2 MMI coupler 355 is followed by a sequence of directional couplers 360, 365, and 375, which are connected by the two channels 375 and 377 (e.g., waveguides) having different overall lengths. In particular, the first channel 375 has a first delay stage 356 of length L, and the second channel 377 includes the second and third delay stages 361 and 366 of filter 350. The second delay stage 361 has a length of 2L plus a relative phase shift (e.g., t) of light traversing the channel, and the third delay stage 366 has a length of 2L. In some example embodiments, the output of directional coupler 370 is two composite signals 380 and 382 as discussed above. Whether filter 300 of FIG. 3A or filter 350 of FIG. 3B is implemented as a stage 1 filter 205 can depend on different factors, such as the layout or space requirements of other components in demultiplexer 120 or receiver 125.

Figure 4A:
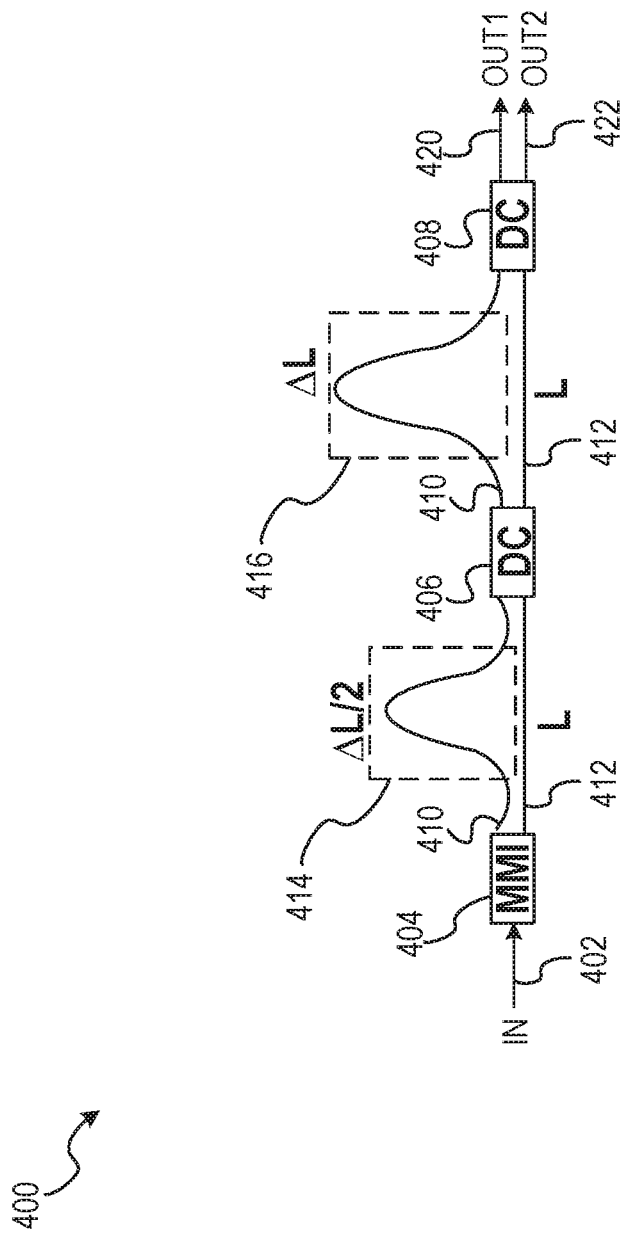
FIG. 4A shows an example filter that can be implemented as a stage 2 filter, according to some example embodiments.

FIG. 4A shows an example filter 400 that can be implemented as a stage 2 or stage 3 filter (e.g., stage 2 filter 210, stage 3 filter 240 of FIG. 2), according to some example embodiments. As illustrated, the filter 400 is a higher-order MZI filter comprising a 1×2 multimode interferometer (MMI) coupler 404 that receives a single input signal 402 and outputs to a first channel 410 and a second channel 412. The 1×2 MMI coupler 404 is followed by two directional couplers 406 and 408, which are connected by the two channels 410 and 412 (e.g., waveguides) having different overall lengths. In particular, the first channel 410 has a first delay stage 414 and a second delay stage 416, with the second delay stage 416 having a length value L, and the first delay stage 414 being half as long, L/2. The output of directional coupler 405 can include a first composite signal 420 and a second composite signal 422, as discussed above.

Figure 4B:
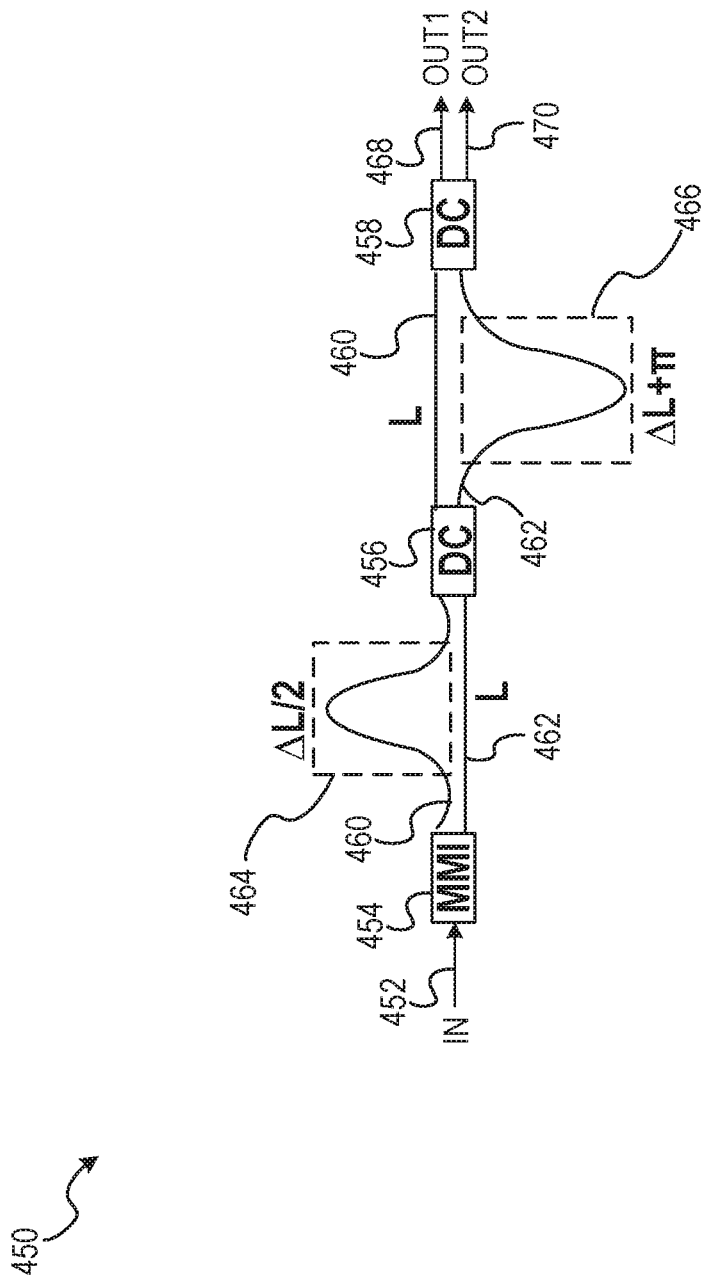
FIG. 4B shows an example filter that can be implemented as a stage 2 filter, according to some example embodiments.

FIG. 4B shows an example filter 450 that can be implemented as a stage 2 or stage 3 filter (e.g., stage 2 filter 210, stage 3 filter 240) instead of filter 400 of FIG. 4A, according to some example embodiments. The filter 460 is a higher-order MZI filter comprising a 1×2 multimode interferometer (MMI) coupler 454 that receives a single input signal 452 (e.g., a composite signal A/C) and generates two output signals (e.g., signal A and signal C). The 1×2 MMI coupler 454 is followed by two directional couplers 456 and 458, which are connected by a first channel 460 and a second channel 462 (e.g., waveguides) having different overall lengths. The first channel 460 has a first delay stage 464, and the second channel has a second delay stage 466. The second delay stage 466 has a length of L plus half a wavelength (e.g., r), and the first delay stage has a length of L/2. The output of directional coupler 458 can include a first composite signal 468 and a second composite signal 470.

Figure 5:
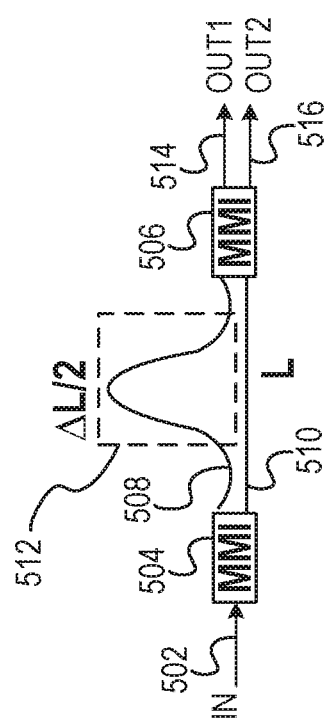
FIG. 5 shows an example filter architecture that can be implemented in a stage 3 filter, according to some example embodiments.

FIG. 5 shows an example filter 500 architecture that can be implemented as a stage 2 or stage 3 filter, according to some example embodiments. As illustrated, filter 500 is a single stage MZI filter having a first 1×2 MMI 504 which receives an input signal 502 and outputs to a first channel 508 and a second channel 510. The first channel 508 includes a delay stage 512, which has a length of L/2. The channels input into 2×2 MMI 506, which generates outputs 514 and 516 as discussed above. The third stage filters can be designed as a narrow band FIR or Infinite Impulse Response (IIR) filter designed to reject a greater portion of the broadband ASE, thereby further reducing the ASE*ASE beat noise contribution in a photodetector. An example third-stage optical IIR filter is a ring-filter in drop configuration. Further, in some embodiments, the narrow band FIR/IIR filters have active control to keep the narrow band filter aligned with the incoming signal wavelength. In some embodiments active control is accomplished by monitoring the photodetector current and then aligning accordingly.

Figure 6:
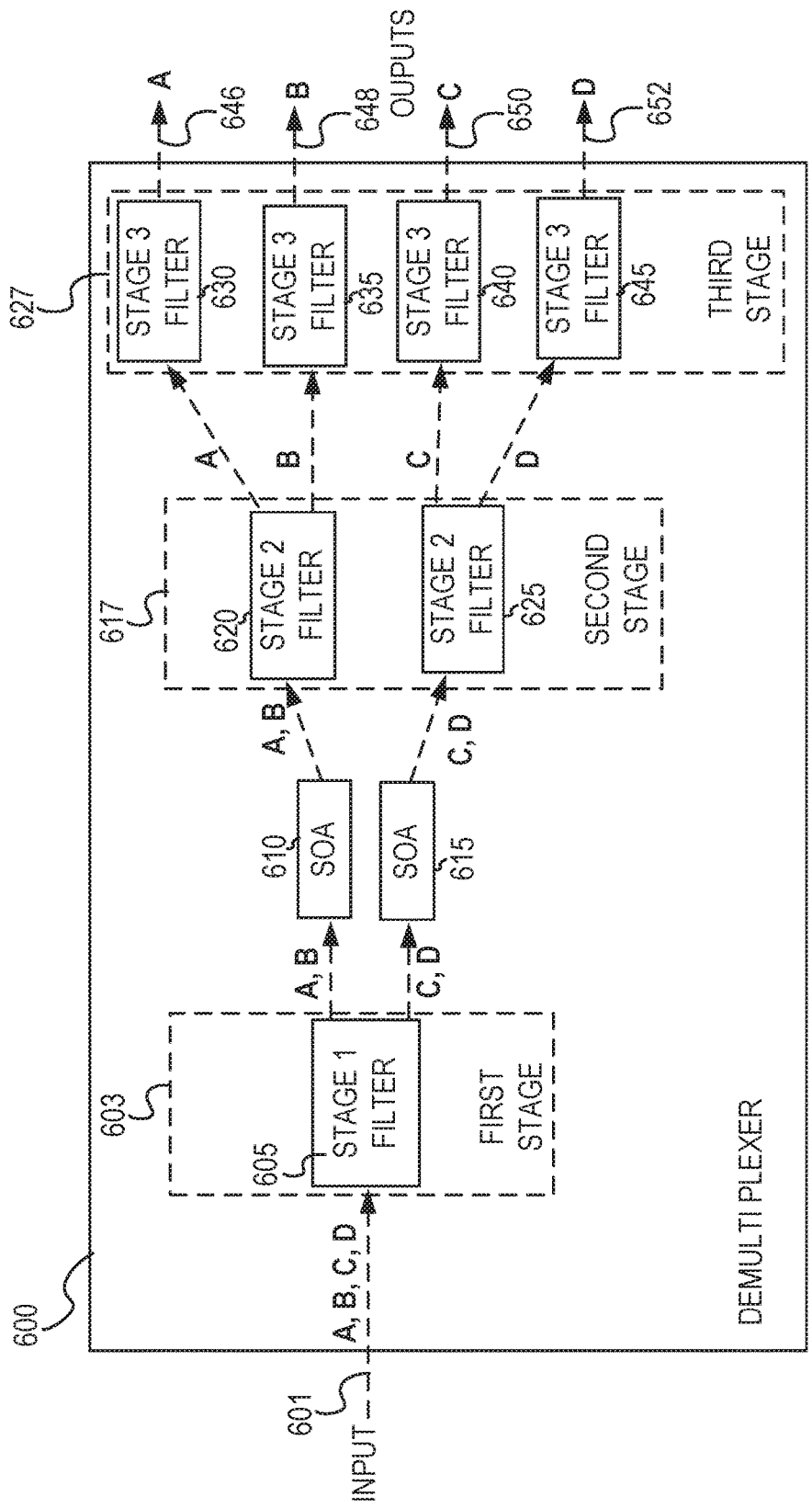
FIG. 6 illustrates an amplifying optical demultiplexer, according to some example embodiments.

FIG. 6 illustrates an amplifying optical demultiplexer 600, according to some example embodiments. As illustrated, the demultiplexer 600 is designed to split four CWDM signals on channels spaced 20 nm apart, with SOAs placed between the first and second stages. The demultiplexer 600 comprises a plurality of stages, such as a first stage 603, a second stage 617, and a third stage 627, according to some example embodiments. The first stage 603 has a stage 1 filter 605 that separates a combined input signal 601 into two composite signals: a first composite signal that includes signal A and signal B, and a second composite signal that includes signal C and signal D. In this example embodiment, the stage 1 filter 605 is a high/low bandpass filter that separates high signals (e.g., A and B) and low signals (e.g., C and D).

Each of the composite signals generated from the first stage 603 can be amplified by integrated SOAs that are integrated into the demultiplexer 600 as internal components, such as SOA 610 and 615. That is, for example, SOA 610 amplifies the first composite signal (e.g., signal A/B) and the SOA 615 amplifies the second composite signal (e.g., signal C/D).

The second stage 617 has a plurality of stage 2 filters, including stage 2 filter 620 and stage 2 filter 625. The stage 2 filter 620 receives the first amplified composite signal and separates the composite signal into two individual signals: signal A and signal B. Likewise, the stage 2 filter 625 receives the second composite signal and separates the composite signal into two individual signals: signal C and signal D.

The third stage 627 can be used to further refine or otherwise suppress unwanted noise in the signals (e.g., crosstalk, broad spectrum white noise, noise added by the amplifiers). As illustrated, the third stage 627 includes stage 3 filters 630-645, each of which further filters and outputs individual signals 646-652, as illustrated. The further filtered individual signals 646-652 from the third stage 627 can then be output to receivers, e.g., photodiodes, for detection and further processing or routing.

One advantage of demultiplexer 600 is that it includes fewer SOAs, which means lower power consumption for the demultiplexer 600 and the receiver generally. The trade-off is that the amplifiers must be designed to have enough optical gain bandwidth and saturation power to support two neighboring channels (e.g., composite signal A/B, which are 20 nm apart). In some embodiments, the SOAs between stage 1 and stage 2 handle non-neighboring signals. That is, for example, stage 1 filter 605 can generate a first composite signal A/C and a second composite signal B/D, which are each input into separate SOAs to increase gain. In those embodiments, even though the SOAs must handle increased optical bandwidth due to the signals no longer being neighbors, the optical bandwidth and saturation requirements are still practical. A further advantage of demultiplexer 600 is that the composite signal input into the SOAs has had some of the noise (e.g., ASE-ASE beat noise) filtered out by the filters in the first stage.

In some example embodiments, demultiplexer 600 does not include a third stage 627. That is, for example, the demultiplexer 600 only includes the first stage 603, the SOAs 610 and 615, and the second stage 617, and the additional refining of signals in the third stage 627 is omitted. For instance, after second stage 617 separates the amplified composite signals into a plurality of individual signals, the individual signals are output from demultiplexer 600.

Figure 7:
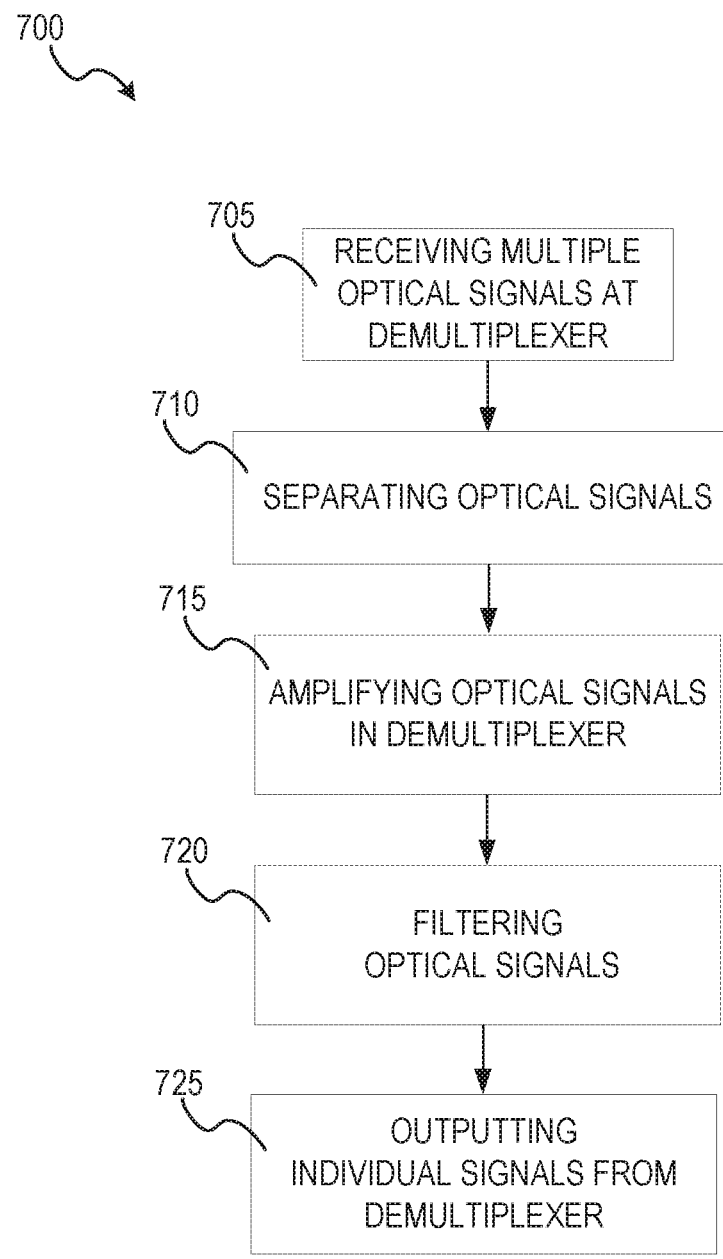
FIG. 7 shows an example flow diagram of a method for implementing an amplifying optical demultiplexer, according to some example embodiments.

FIG. 7 shows an example flow diagram of a method 700 for generating several signals from a combined signal using an amplifying optical demultiplexer, according to some example embodiments.

At operation 705, the demultiplexer (e.g., the demultiplexer 120 as shown in FIG. 1) receives multiple optical signals. The multiple optical signals may be combined as a single input signal that can be transmitted over a shared medium, such as a fiber-optic cable. At operation 710, an optical filter separates the multiple optical signals. For example, at operation 710 the optical filter separates the received multiple optical signals into a first composite signal and a second composite signal, where each of the composite signals further comprise two sub-signals. As a further example, at operation 710, the optical filter can separate the received multiple signals into a plurality of individual signals. At operation 715, a plurality of optical amplifiers amplify the separated signals. At operation 720, a plurality of additional optical amplifiers further filter the optical signals. For example, at operation 720 the plurality of additional optical filters may further filter the optical signals by further separating the signals into individual signals. Further, according to some example embodiments, at operation 720 the plurality of additional optical filters may further filter the optical signals by removing or otherwise suppressing unwanted noise in the signals. At operation 725, the demultiplexer 120 outputs the individual signals to a plurality detectors (e.g., photodiodes) for further processing and/or routing.

Figure 8:
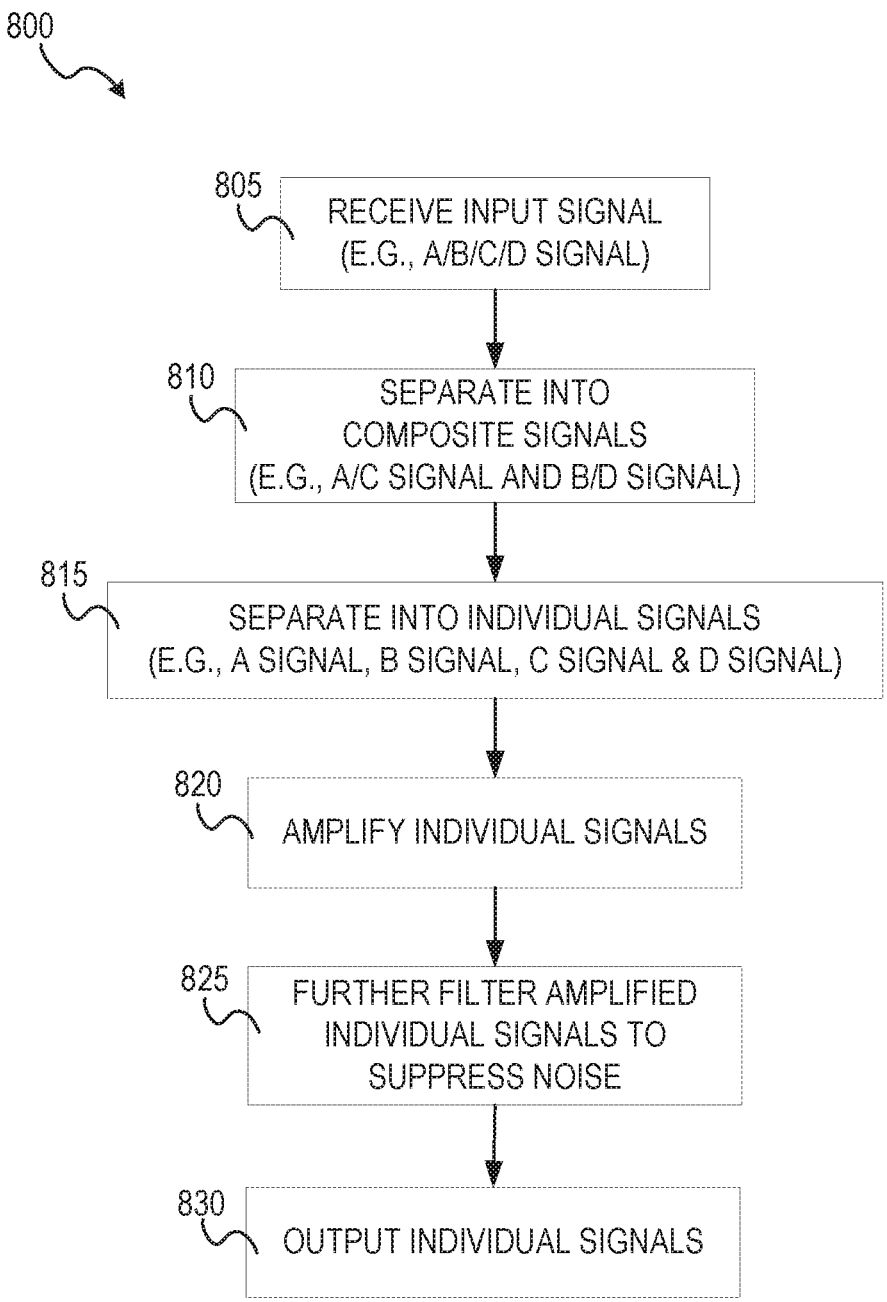
FIG. 8 shows a flow diagram of a method for implementing an amplifying optical demultiplexer, according to some example embodiments.

FIG. 8 shows a flow diagram of a method 800 for generating several signals from a combined signal using an amplifying optical demultiplexer 200 of FIG. 2, according to some example embodiments. At operation 805, the demultiplexer 200 receives an input signal. For example, the demultiplexer 200 may receive a composite input signal having four sub-signals: sub-signal A, sub-signal B, sub-signal C, and sub-signal D, each of which may have different wavelengths, spaced by the same amount. That is, for example, sub-signal B can have a wavelength that is 20 nm larger than the wavelength of sub-signal A. Likewise, sub-signal C can have a wavelength it is 20 nm larger than the wavelength of sub-signal B, and so on.

At operation 810, optical filters in the first stage 203 separate the input signal into composite signals. For example, the stage 1 filter 205 separates the input signal A/B/C/D into an A/C signal and a B/D signal. At operation 815, optical filters in the second stage 207 further separate the composite signals received from the first stage 203. For example, the stage 2 filter 210 can separate the A/C signal into an A-signal and a C-signal. Likewise, the stage 2 filter 215 can separate the B/D signal into a B-signal and a D-signal.

At operation 820, the individual signals are amplified. For example, the amplifier 220 amplifies individual A-signal, the amplifier 225 amplifies the C-signal, the amplifier 230 amplifies the B-signal, and the amplifier 235 amplifies D-signal. At operation 825, optical filters in a third stage 237 further filter the individual signals to suppress noise such as cross talk from other signals, broad spectrum white noise, or noise added by other components in the demultiplexer 200 (e.g., the SOAs 220-235). At operation 830, the demultiplexer 200 outputs the amplified and separated signals. In some example embodiments, the demultiplexer 200 does not include a third stage, as discussed above. In those example embodiments, after the individual signals are amplified at operation 820 the method 800 skips operation 825 (which are third stage filter processes) and goes to operation 830, where the amplified individual signals are output from the demultiplexer.

Figure 9:
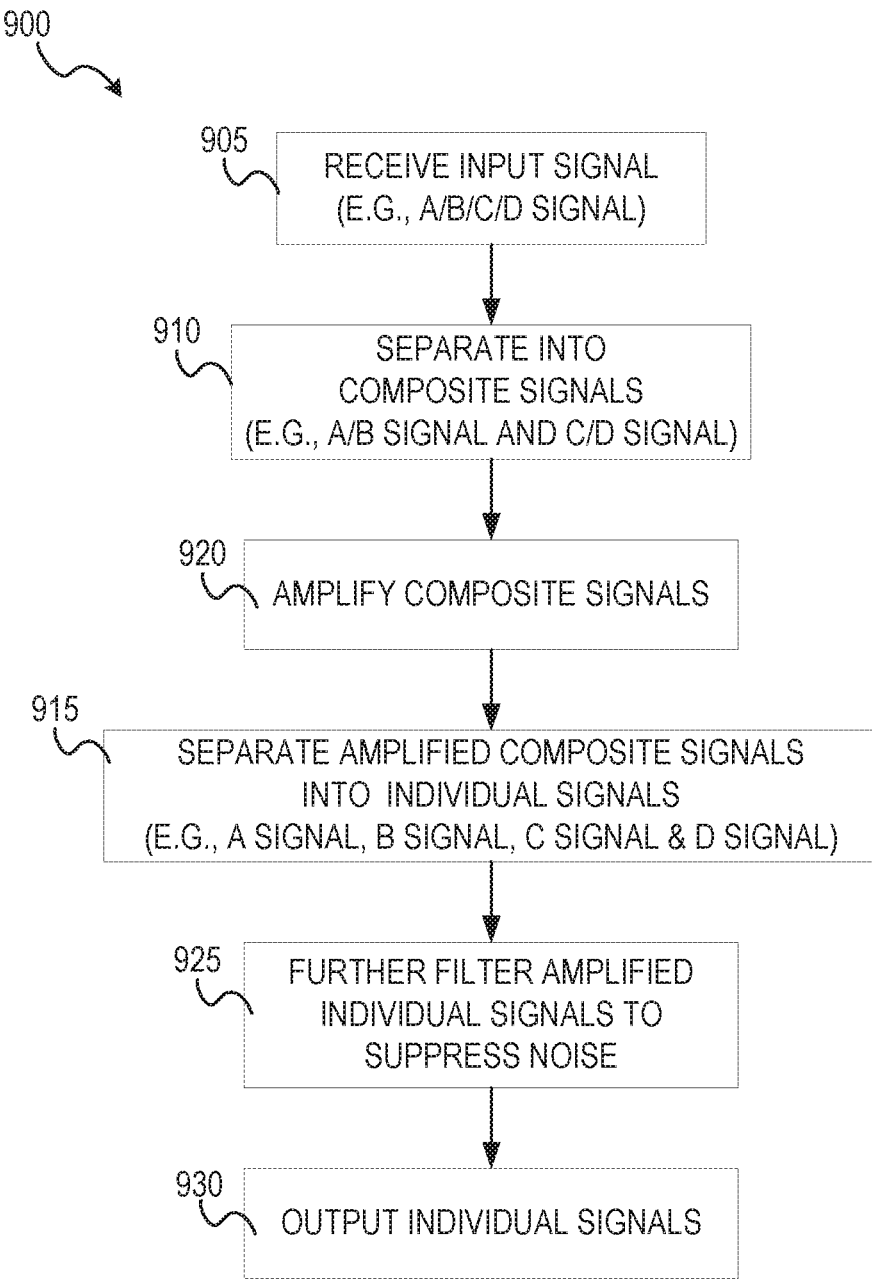
FIG. 9 shows a flow diagram of a method for implementing an amplifying optical demultiplexer, according to some example embodiments.

FIG. 9 shows a flow diagram of a method 900 for separating several signals from a combined signal using an amplifying optical demultiplexer 600 of FIG. 6, according to some example embodiments. At operation 905, the demultiplexer 600 receives an input signal. For example, the demultiplexer 600 may receive a composite input signal having four sub-signals: sub-signal A, sub-signal B, sub-signal C, and sub-signal D. Each of the four sub-signals may have different wavelengths that are spaced by the same amount. That is, for example, sub-signal B can have a wavelength that is 20 nm larger than the wavelength of sub-signal A. Likewise, sub-signal C can have a wavelength it is 20 nm larger than the wavelength of sub-signal B, and so on.

At operation 910, optical filters in the first stage 603 separate the input signal into composite signals. For example, the stage 1 filter 605 separates the input signal into an A/B signal and a C/D signal.

At operation 920, the composite signals are amplified. For example, the amplifier 610 amplifies individual A/B signal, the amplifier 615 amplifies the C/D-signal. At operation 915, optical amplifiers in the second stage 617 separate the amplified composite signals into amplified individual signals. For example, the stage 2 filter 620 receives the A/B signal and separates the A/B signal into an A-signal and a B-signal. Likewise, the stage 2 filter 625 separates the C/D signal into a C-signal and a D-signal. At operation 925, optical filters in the third stage 627 further filter the individual signals to suppress noise, such as crosstalk from other signals, broad spectrum noise, or noise added by other components in the demultiplexer 600 (e.g., SOA 610, SOA 615). At operation 930, the demultiplexer 600 outputs the individual signals.

While various embodiments have been described above, it should be understood that they have been presented by way of example only, and not limitation. Where methods described above indicate certain events occurring in certain order, the ordering of certain events may be modified.

Additionally, certain of the events may be performed concurrently in a parallel process when possible, as well as performed sequentially as described above. Accordingly, the specification is intended to embrace all such modifications and variations of the disclosed embodiments that fall within the spirit and scope of the appended claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of processing optical signal, the method comprising:
    receiving, by a multistage semiconductor demultiplexer having integrated semiconductor filters and integrated semiconductor amplifiers, an input signal having multiple optical signals, the integrated semiconductor filters comprising a Mach-Zehnder Interferometer (MZI) filter in an initial stage of the multistage semiconductor demultiplexer and additional MZI filters in an additional stage of the multistage semiconductor demultiplexer, and the integrated semiconductor amplifiers comprising semiconductor optical amplifiers between the initial stage and the additional stage;
    separating the multiple optical signals using the MZI filter in the initial stage;
    generating, within the demultiplexer and using the multiple semiconductor optical amplifiers, amplified optical signals by amplifying the multiple optical signals that have been separated by the MZI filter in the initial stage; and
    generating filtered optical signals by filtering the amplified optical signals using the additional MZI filters in the additional stage.

2. The method of claim 1, wherein the multistage semiconductor demultiplexer further comprises intermediate MZI filters in an intermediate stage, the intermediate MZI filters being located between the MZI filter of the initial stage and the semiconductor optical amplifiers.

3. The method of claim 2, wherein the MZI filter in the initial stage separates the multiple optical signals into a plurality of composite signals, each of the composite signals comprising a plurality of individual signals of different wavelengths.

4. The method of claim 3, further comprising:
    generating, using the intermediate MZI filters in the intermediate stage, a plurality of individual signals from the plurality of composite signals.

5. The method of claim 4, wherein each of the semiconductor optical amplifiers amplify an individual signal from the plurality of individual signals.

6. The method of claim 3, wherein the amplified optical signals are a plurality of amplified composite signals that are generated from the plurality of composite signals using the semiconductor optical amplifiers.

7. The method of claim 1, wherein the MZI filter comprises a first plurality of optical couplers and each of the additional MZI filters comprises a second plurality of optical couplers, the first plurality of optical couplers of the MZI filter having at least one optical coupler more than the second plurality of optical couplers of the additional MZI filters.

8. The method of claim 1, wherein the multistage semiconductor demultiplexer further comprises output MZI filters in an output stage, the output MZI filters being located after the additional MZI filters of the additional stage.

9. The method of claim 8, wherein the filtered optical signals generated by the additional MZI filters are a plurality of individual signals.

10. The method of claim 9, further comprising:
generating, using the output MZI filters in the output stage, output signals by suppressing noise in the plurality of individual signals.

11. The method of claim 1, wherein the input signal comprises a first signal, a second signal, a third signal, and a fourth signal; and
wherein the first signal having a smaller wavelength than the second signal, the second signal having a smaller wavelength than the third signal, the third signal having a smaller wavelength than the first signal.

12. The method of claim 11, wherein one of the semiconductor optical amplifiers amplifies a composite signal comprising the first signal and the second signal, and another of the semiconductor optical amplifiers amplifies another composite signal comprising the third signal and the fourth signal.

13. The method of claim 1, wherein the semiconductor optical amplifiers are coupled to the additional MZI filters of the additional stage.

14. An optical device for processing optical signal, the optical device comprising:
a multistage semiconductor demultiplexer to receive an input signal having multiple optical signals, the multistage semiconductor demultiplexer comprising:
an MZI filter in an initial stage to separate the multiple optical signals;
semiconductor optical amplifiers, integrated within the multistage semiconductor demultiplexer, to generate amplified optical signals by amplifying the multiple optical signals that are separated by the MZI filter; and
additional MZI filters in an additional stage to generate filtered optical signals by filtering the amplified optical signals, the semiconductor optical amplifiers being integrated in the multistage semiconductor demultiplexer between the MZI filter in the initial stage and the additional MZI filters in the additional stage.

15. The optical device of claim 14, wherein the multistage semiconductor demultiplexer further comprises intermediate MZI filters in an intermediate stage, the intermediate MZI filters being located between the MZI filter of the initial stage and the semiconductor optical amplifiers.

16. The optical device of claim 15, wherein the MZI filter in the initial stage separates the multiple optical signals into a first composite signal and a second composite signal; and
wherein the intermediate MZI filters separate the first composite signal and the second composite signal into a plurality of individual signals.

17. The optical device of claim 16, wherein each of the additional MZI filters in the additional stage filters one of the plurality of individual signals to suppress noise.

18. The optical device of claim 14, wherein the multistage semiconductor demultiplexer further comprises output MZI filters in an output stage, the output MZI filters being located after the additional MZI filters of the additional stage.

19. The optical device of claim 18, wherein the MZI filter in the initial stage separates the multiple optical signals into a plurality of composite signals;
wherein the additional MZI filters in the additional stage separate the plurality of composite signals into a plurality of individual optical signals;
wherein each of the semiconductor optical amplifiers amplifies one of the plurality of individual optical signals; and
wherein the each of the output MZI filters in the output stage filters one of the plurality of individual optical signals to suppress noise.

* * * * *